Sept. 22, 1942.   J. N. SMITH ET AL   2,296,372
MANUFACTURE OF BELTING AND LIKE PRODUCTS
Filed Dec. 28, 1939   4 Sheets-Sheet 1

INVENTOR
J. Newton Smith & John M. Bierer.
BY
ATTORNEY

Sept. 22, 1942.   J. N. SMITH ET AL   2,296,372
MANUFACTURE OF BELTING AND LIKE PRODUCTS
Filed Dec. 28, 1939   4 Sheets-Sheet 2

INVENTORS
J. Newton Smith & John M. Brerer.
BY
Kenway & Witter
ATTORNEY

Sept. 22, 1942.  J. N. SMITH ET AL  2,296,372
MANUFACTURE OF BELTING AND LIKE PRODUCTS
Filed Dec. 28, 1939  4 Sheets-Sheet 3

INVENTORS
J. Newton Smith & John M. Brierer.
BY
Henway & Witter
ATTORNEY

Sept. 22, 1942.   J. N. SMITH ET AL   2,296,372
MANUFACTURE OF BELTING AND LIKE PRODUCTS
Filed Dec. 28, 1939   4 Sheets-Sheet 4
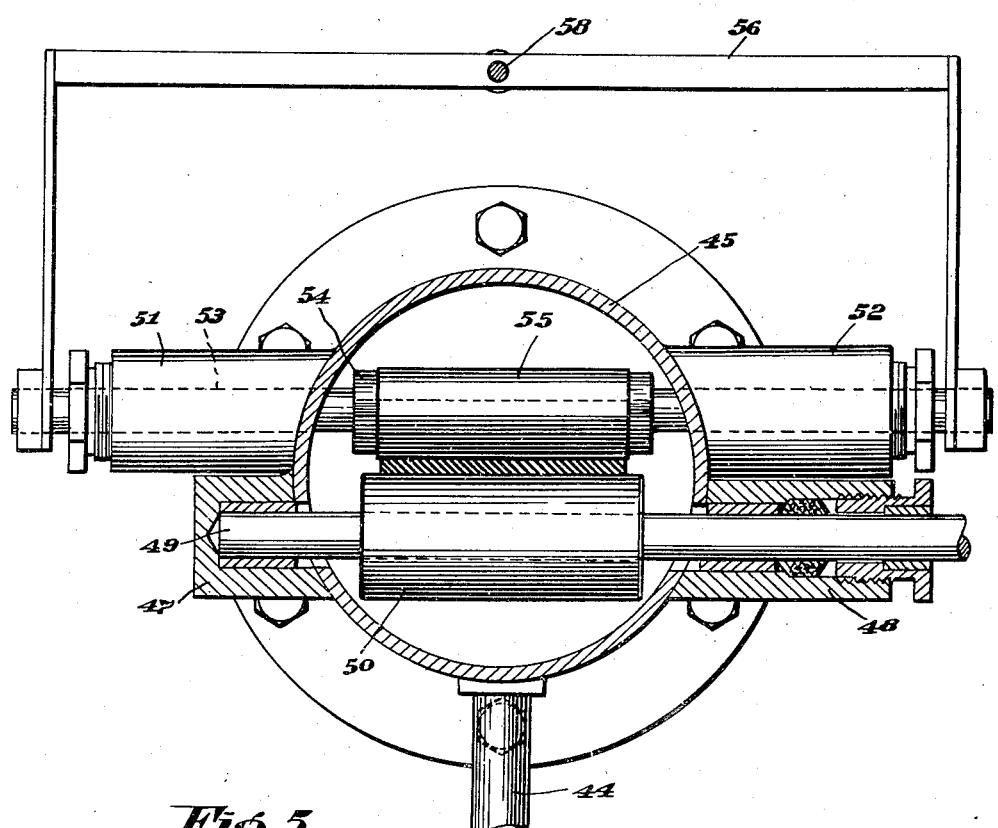
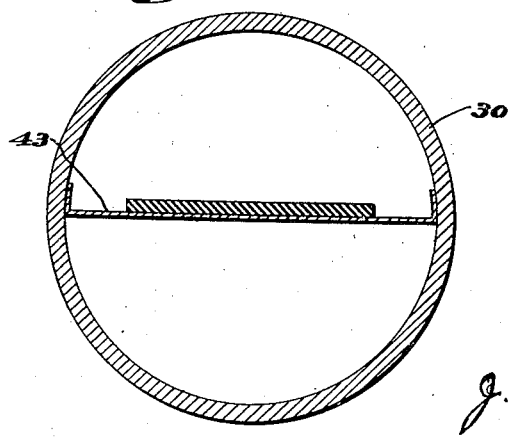
INVENTORS
J. Newton Smith & John M. Bierer
BY Kenway & Witter
ATTORNEY Patented Sept. 22, 1942

2,296,372

UNITED STATES PATENT OFFICE 2,296,372

MANUFACTURE OF BELTING AND LIKE PRODUCTS

Joseph Newton Smith, Salem, and John M. Bierer, Waban, Mass., assignors to Boston Woven Hose and Rubber Company, Cambridge, Mass., a corporation of Massachusetts Application December 28, 1939, Serial No. 311,368

2 Claims. (Cl. 18—53)

This invention relates to the manufacture of rubber belting or related rubberized products. It consists in an improved process of vulcanizing rubber belting or the like, characterized by the two steps of subjecting the product to progressive partial vulcanization between heated pressure surfaces and then completing the vulcanization while its surfaces are unconfined.

Heretofore rubber belting has been completely vulcanized in one operation by the commercial process disclosed in U. S. Letters Patent No. 2,093,904, granted September 21, 1937, on an application of J. M. Bierer. In that process the belting is advanced slowly about the circumference of a large heated drum and maintained throughout this movement under pressure imparted to it by a steel band tensioned about the drum and moving therewith. This commercial process results in an entirely satisfactory product, but it has the disadvantage of tying up expensive apparatus for long periods of time, for example, the usual rate of movement of the drum in vulcanizing one type of wide rubber belting is about 2" per minute, so that completely to vulcanize 100 ft. of belting requires the continuous operation of the vulcanizing machine of 10 hours.

The principal object of the present invention is to make available for the industry a process in which this drum-vulcanizing step may be substantially reduced in time without any impairment of the resulting belting and possibly with some improvement in its quality. We have discovered that this may be achieved and the output of drum-vulcanizing apparatus substantially increased by employing that apparatus to produce only a fractional part of the cure, for example, one-half or one-third of the cure, and following this by a suplementary vulcanizing step carried out under suitable conditions of pressure and heat. We have found, for example, that by doubling the speed of the drum apparatus belting may be carried through a continuous step of partial vulcanization under pressure and heat resulting in imparting to the belting about one-half cure, compacting the fibres of the product and rendering it non-tacky so that it can be conveniently handled. The belting as removed from the drum may be now given a rest period in storage or it may be immediately subjected to a supplementary cure under more than atmospheric fluid pressure, and at a vulcanizing temperature. By this supplementary step the belting is completely vulcanized and in all respects is equal in quality to belting which has been completely cured under pressure in the drum apparatus.

An important advantage of the novel process of my invention is that the supplementary cure step may be carried out in apparatus of more or less general application. That is, a pressure chamber and belting feeding mechanism may be conveniently provided for handling belting of the full range of widths produced by a battery of drum vulcanizing machines designed to produce different widths of belting.

Preferably and as herein shown the belting is maintained under appreciable tension during the step of the supplementary cure. In this way shrinkage of the product is prevented and it is maintained in substantially the same physical condition in which it leaves the drum vulcanizing apparatus.

It is important during the second step of the process to maintain the partially cured product under a fluid pressure greater than the vapor pressure of any of the components of the product itself, that is to say, greater than the vapor pressure created by the heated ingredients of the rubberized material. If this is not done the product may be impaired by blowing or blistering, but this danger is obviated by maintaining the product under a fluid pressure of 30 lbs. to 75 lbs., a gaseous fluid such as air, nitrogen, or carbon dioxide being entirely suitable for the purpose.

The novel process of our invention is not limited to any specific apparatus. That herein shown for carrying out the second step of the process includes an elongated pressure chamber disposed between a let-off chamber and wind-up chamber. The semi-cured belting is placed in a coil in the let-off chamber, conducted continuously through the pressure chamber and wound up in completely vulcanized condition in the wind-up chamber. Preferably, and as herein shown, substantially equal gas or vapor pressure is maintained throughout the system.

These and other characteristics of the novel process will be best understood and appreciated from the following description of a preferred manner of putting it into practice, disclosed in connection with the illustrative apparatus shown in the accompanying drawings, in which, Fig. 1 is a diagrammatic view of one type of apparatus suitable for carrying out the first step of the process.

Fig. 4 is a sectional view on the line 4—4 of Fig. 3, and

Fig. 5 is a view in cross-section on the line 5—5 of Fig. 3.

Figure 1:
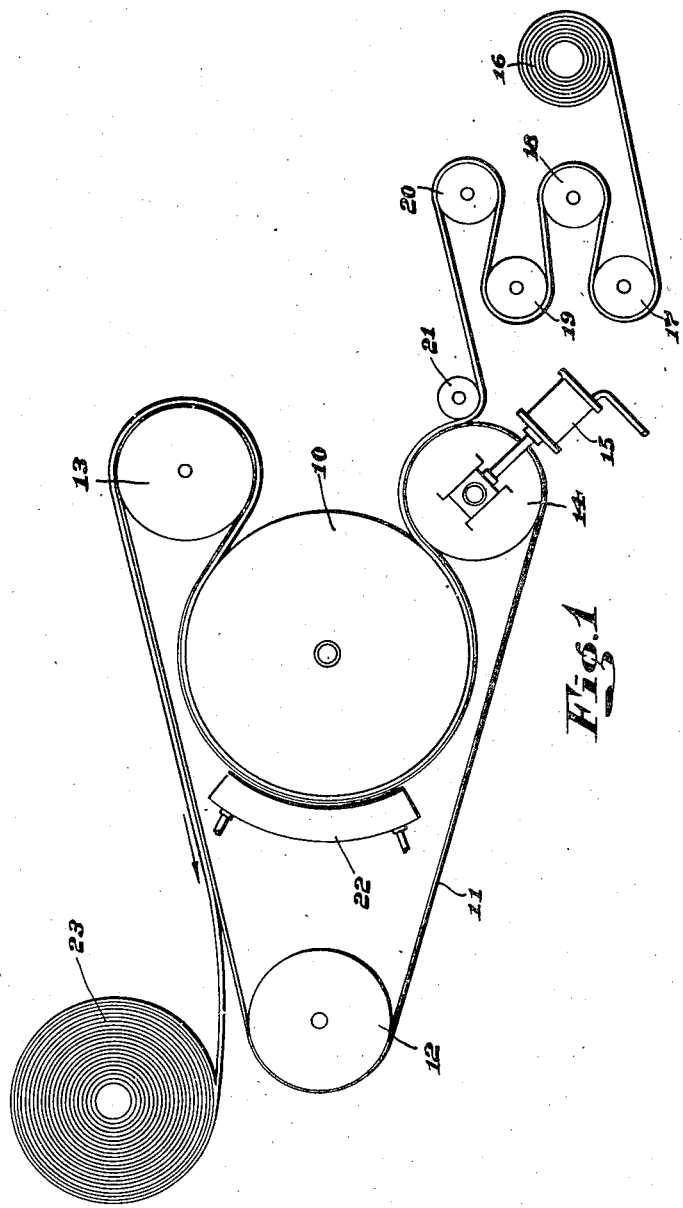

The apparatus shown diagrammatically in Fig. 1 of the drawings is similar to that referred to in U. S. Letters Patent No. 2,093,904 and is typical of the drum vulcanizing apparatus which may be used in carrying out the first or partial curing step of our novel process. The apparatus comprises a large heated vulcanizing drum 10 about a substantial arcuate portion of which extends a steel band 11, being supported in a general triangular path by rolls 12, 13 and 14. The roll 14 is a pressure roll and hydraulic cylinders 15 cooperating therewith are adapted to force this roll against the band and drum with considerable pressure. The pressure roll 14 is also preferably heated thereby preheating the belting as it is delivered to the vulcanizing drum.

One type of belting successfully treated by the process herein disclosed includes woven textile fabric of one or more plies embedded in and more or less impregnated by coating layers of rubber. The untreated belting is drawn from a coil 16, passed through the vulcanizing apparatus and the semi-cured product is rolled into a coil 23. It is desirable that the belting shall be as nearly stretch-proof as possible when finished and the strip is therefore placed under substantial stretching tension during its passage to and upon the vulcanizing drum. This tensioning may be produced by passing the strip over and in extended surface contact with a plurality of cylindrical rolls 17, 18, 19 and 20 geared together, as explained in U. S. Letters Patent No. 1,987,890 granted on an application of J. M. Bierer, and arranged to run at progressively greater surface speeds thereby progressively stretching the strip to greater and greater tension as it passes along and over the rolls. The strip is drawn from the coil 16 and over the rolls 17—20 by the rotation of the power driven drum 10.

The purpose of the pressure roll 14 is to place the belting under relatively high compression, to render the product stronger, more compact and of more uniform thickness. In order to facilitate this treatment, especially with relatively thick and heavy belting, the product is preheated prior to its compression by the roll 14 and thus rendered more plastic. The preheating is made more effective by passing the belting beneath an idler roll 21 so located as to give it a path in contact with the band 11 over a substantial portion of the circumference of the heated roll 14 before it reaches the bite of the band 11 and the vulcanizing drum.

The band 11 is maintained under high tension by mechanism tending to force the roller 12 away from the drum 10 so that it exerts a powerful pressure upon the belting as the latter travels about approximately 270° of the circumference of the drum. Not only is the drum heated, but the band itself is heated by one or more steam jackets 22 which are maintained yieldingly in contact with its outer surface opposite the circumference of the drum 10.

As already explained, in carrying out the process of our invention the heated drum and band 11 may be operated at double the speed required for complete vulcanization of the product. The belting reaching the coil 23 is therefore approximately half-cured. Its material has thus been consolidated and final shape imparted thereto and its surface has been rendered non-tacky so that it may be conveniently handled. The belting in this condition is ready for the second step of the process. Suitable apparatus for this step is illustrated in Figs. 2–5 and will now be described.

Figure 2:
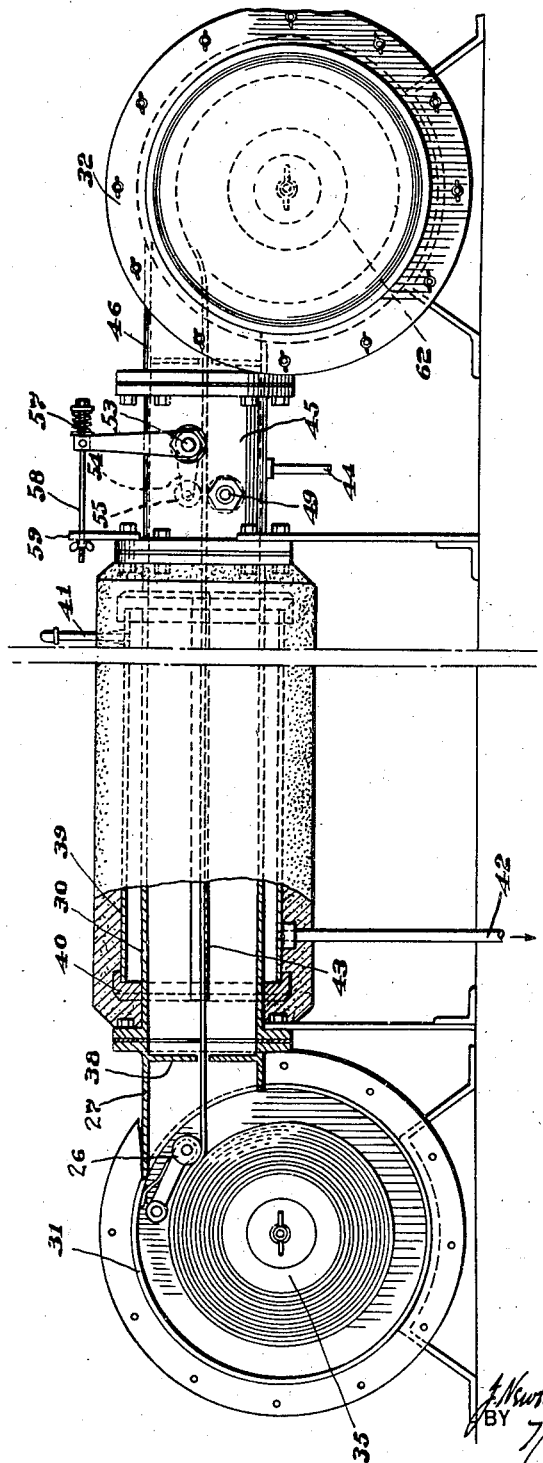
Fig. 2 is a view in elevation, partly in section, of apparatus for carrying out the second step of the process, a portion of the pressure chamber being omitted.
Figure 3:
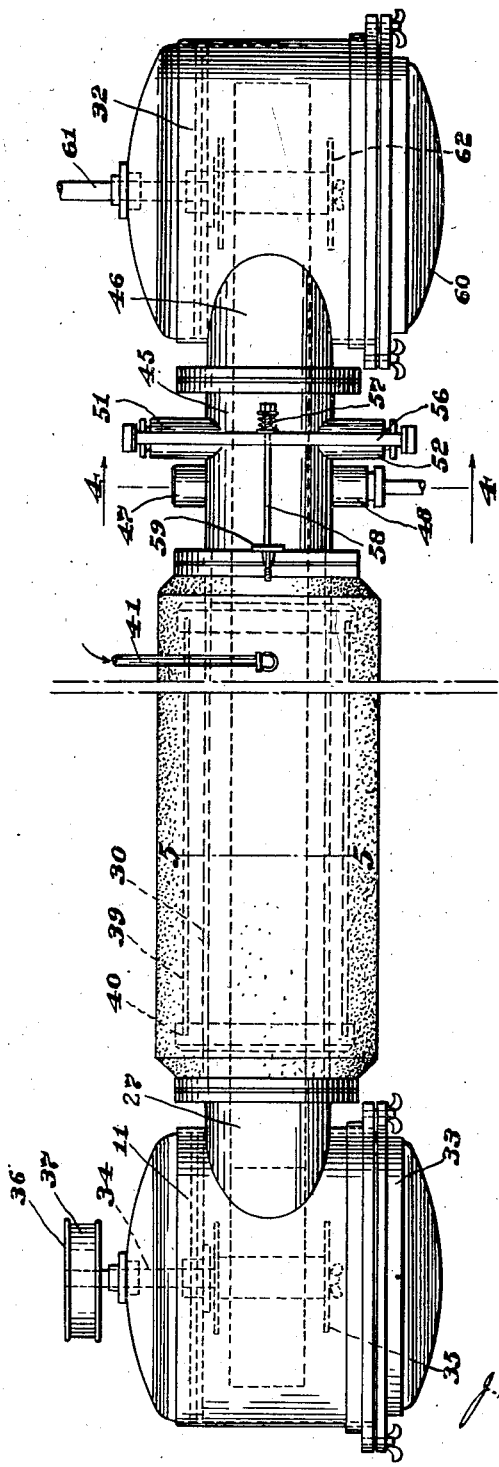
Fig. 3 is a corresponding plan view.

The apparatus herein illustrated comprises a long tubular heating chamber 30 communicating at one end with a let-off chamber 31 and at the other with a wind-up chamber 32. The apparatus is supported at convenient height by suitable legs and the chamber 30 is provided with a thick heat-insulating shell. The let-off chamber is cylindrical in shape and provided with convex heads, the head 33 being detachable and serving as a door which may be removed when a reel of semi-vulcanized belting is to be presented to the apparatus. In the other head are provided bearings for a shaft 34 carrying a reel 35 at its inner end, and having a brake drum 36 partially encircled by a brake band 37 at its outer end. As shown in Fig. 2 a coil of semi-vulcanized belting has been placed upon the reel 35. A spring pressed idler roll 26 determines the point in the circumference of the coil at which the semi-vulcanized belting is let from the let-off chamber.

A pressure chamber 30 as herein shown is formed by a flanged cylindrical tube. At its left hand end this tube is provided with a fitting 27 shaped to make an air-tight connection with the circumferential wall of the let-off chamber, and provided with a vertical wall or diaphragm 38 transversely slotted to permit the passage of the belting. The pressure chamber 30 is provided with a steam jacket 39 terminated at either end by flange rings 40 which fit upon the tube of the pressure chamber. Steam connections 41 and 42 are provided for the steam jacket and a longitudinal trough 43 extends horizontally through the pressure chamber in substantial alignment with the slot in the wall 38. The trough 43 has side flanges and is useful in threading the belting into the apparatus before the belting is tensioned.

A compressed air connection 44 with the chamber 30 provides means by which the whole apparatus may be maintained under any desired degree of vapor pressure.

At its right hand end, the pressure chamber is provided with a tubular fitting 45 and this in turn communicates with the circumferential wall of the wind-up chamber 32 through a supplementary fitting 46 of the same cross section and provided, as is the fitting 27 with a transversely slotted wall or diaphragm. The fitting 45 contains the feed mechanism of the apparatus and to this end is provided with bearings 47—48 for a shaft 49 carrying the feed roll 50. The shaft may be driven at the desired speed from any convenient source of power, not shown. The fitting is also provided with transverse bearings 51 and 52 for a shaft 53 and upon this shaft is mounted a yoke having spaced arms 54 extending toward the pressure chamber. Journaled in the arms 54 of the yoke is the pressure roller 55. Upwardly extending arms are fast to the outer ends of the shaft 53, and between these extends a cross bar 56. This bar is forced toward the left by a compression spring 57 surrounding a rod 58 which is adjustably connected to a bracket 59 extending upwardly from the right hand flange of the pressure chamber. The rod 58 is adjusted to cause the roll 55 to press firmly against the belting interposed between it and the feed roll 50 so that the belting is drawn through the pressure chamber against the tension of the brake drum 36.

The wind-up chamber 32 is also provided with convex heads, the head 60 being removable and serving as a door to permit removal of the coiled completely vulcanized product. The other head is provided with bearings for a shaft 61 which carries at its inner end the wind-up reel 62. The reel 62 is preferably frictionally mounted upon the shaft 61 which is driven at sufficient speed of rotation to cause the reel 62 to take up the belting advanced to it by the feed roll 50.

In carrying out our novel process with the assistance of the above described apparatus a coil of semi-vulcanized belting is placed in the let-off chamber 31 upon the reel 35 and the free end of the belting is led under the roll 26, through the slot in the wall 38, across the compression chamber 30 upon the trough 43, between the feed rolls 50 and 55, through the transverse slot in the wall of the fitting 46 and to the wind-up reel 62. The heads of the let-off and wind-up chambers are then closed and secured in place and meanwhile steam has been admitted to the jacket 39 and the temperature of the compression chamber raised to approximately 287° F. The whole compression chamber 30 is evenly heated to this temperature while the vertical walls in the fittings 27 and 46 act to shield from heat the material in the let-off and take-up coils respectively. Compressed air is admitted through the connection 44 raising the internal pressure of the whole apparatus to more than atmospheric, viz. 30 lbs. minimum to as high as 75 lbs. pressure if desired. The feed roller 50 and the take-up reel are now set in operation and the semi-vulcanized belting is drawn progressively from the let-off reel and advanced through the chamber 30 being subjected meanwhile to heat and fluid pressure. The cure may be thus completed at a rate of travel depending upon the length of the pressure chamber. In apparatus employing a 10 ft. pressure chamber a rate of feed of 6" per minute is satisfactory in producing a completely cured product. It will be apparent that when this supplementary curing operation has been once initiated in the apparatus above described, it requires little or no attention on the part of the manufacturer, but may proceed without special attention until the completely cured belting is wound up upon the wind-up reel whereupon the finished product may be removed from the apparatus.

The apparatus illustrated herein is arranged to be maintained in its entirety under relatively high fluid pressure, but it is contemplated that if desired the let-off and take-up chambers may be separated from the horizontal pressure chamber by fluid pressure seals. Under such circumstances only that portion of the product located between the two coils would be subjected to the heat and fluid pressure of the supplementary vulcanizing step, while the coils themselves would remain at substantially atmospheric pressure.

As already intimated belting cured in two steps as above outlined and given a rest period between the steps may show some signs of superiority in quality as compared to identical belting completely cured in one step by the usual trade processes. Accordingly the invention includes within its scope the novel belting herein shown as produced by the practice of the two-step process herein disclosed.

While rubber belting has been specifically discussed in describing the process of our invention, it will be understood that we have in mind to apply it to the manufacture of rubberized flooring, and sheet goods including rubber apron stock, hospital sheeting, etc.

Having thus disclosed our invention and fully described it in certain specific examples for illustrative purposes, we claim as new and desire to secure by Letters Patent:

1. A continuous method of curing belting or the like, which consists in continuously passing the belting longitudinally along a predetermined path defined by heated surfaces in high pressure shaping and vulcanizing contact with the belting and moving therewith at a speed which delivers the belting therefrom in shaped and semi-cured condition, and thereafter continuously passing the semi-cured belting longitudinally through another predetermined path and in contact with a non-shaping vulcanizing medium at a speed which delivers the belting therefrom in fully cured condition.

2. A continuous method of curing belting or the like, which consists in continuously passing the belting longitudinally along a predetermined path defined by heated surfaces in shaping and vulcanizing pressure contact with the belting and moving therewith at a speed which delivers the belting therefrom in a semicured condition, and thereafter continuously passing the semi-cured belting longitudinally through a chamber and in pressure contact with a heated vulcanizing gas in the chamber at a speed which delivers the belting from the chamber in a fully cured condition.

J. NEWTON SMITH.
JOHN M. BIERER.